(12) United States Patent
Harris (10) Patent No.: US 7,360,688 B1
(45) Date of Patent: Apr. 22, 2008

(54) INTELLIGENT CREDIT CARD SYSTEM

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 697 days.

(21) Appl. No.: 09/690,074

(22) Filed: Oct. 16, 2000

(51) Int. Cl.
*G06K 5/00* (2006.01)
(52) U.S. Cl. ................................ 235/380; 235/492
(58) Field of Classification Search ............... 235/380, 235/492, 493, 379, 451, 486; 713/172, 160, 713/161, 182
See application file for complete search history.

(56) References Cited

U.S. PATENT DOCUMENTS

| | | | |
|---|---|---|---|
| 3,604,900 A | | 9/1971 | Kalt |
| 3,805,238 A | * | 4/1974 | Rothfjell ................. 382/118 |
| 3,850,426 A | | 11/1974 | Blair |
| 4,608,486 A | * | 8/1986 | Berstein et al. ............ 235/375 |
| 4,672,661 A | | 6/1987 | Clark, Jr. et al. |
| 4,701,601 A | | 10/1987 | Francini et al. |
| 4,811,387 A | | 3/1989 | Hollewed et al. |
| 4,859,837 A | * | 8/1989 | Halpern .................. 235/375 |
| 4,877,950 A | * | 10/1989 | Halpern .................. 235/380 |
| 4,972,476 A | * | 11/1990 | Nathans ................... 713/186 |
| 5,193,114 A | * | 3/1993 | Moseley ................... 713/183 |
| 5,311,003 A | | 5/1994 | Saroya |
| 5,553,155 A | * | 9/1996 | Kuhns et al. ............. 382/115 |
| 5,590,038 A | * | 12/1996 | Pitroda ..................... 705/41 |
| 5,734,722 A | * | 3/1998 | Halpern .................. 235/380 |
| 5,815,252 A | * | 9/1998 | Price-Francis ............. 356/71 |
| 5,867,795 A | * | 2/1999 | Novis et al. .............. 455/550 |
| 5,884,271 A | * | 3/1999 | Pitroda ..................... 705/1 |
| 5,895,909 A | * | 4/1999 | Yoshida .................. 235/487 |
| 6,002,767 A | | 12/1999 | Kramer |
| 6,019,284 A | * | 2/2000 | Freeman et al. ............ 235/380 |
| 6,044,360 A | | 3/2000 | Picciallo |
| 6,068,183 A | * | 5/2000 | Freeman et al. ............ 235/375 |
| 6,142,369 A | * | 11/2000 | Jonstromer ................ 235/379 |
| 6,145,739 A | * | 11/2000 | Bertina et al. ............ 235/380 |
| 6,145,748 A | * | 11/2000 | Neifer et al. .............. 235/486 |
| 6,186,402 B1 | * | 2/2001 | Johnson .................. 235/475 |
| 6,257,486 B1 | * | 7/2001 | Teicher et al. ............ 235/380 |
| 6,385,318 B1 | * | 5/2002 | Oishi ..................... 380/262 |
| 6,394,341 B1 | * | 5/2002 | Makipaa et al. ............ 235/379 |
| 6,409,086 B1 | * | 6/2002 | Pellaumail et al. ....... 235/462.13 |
| 6,450,407 B1 | * | 9/2002 | Freeman et al. ............ 235/492 |
| 6,457,647 B1 | * | 10/2002 | Kurihashi et al. .......... 235/486 |
| 6,744,874 B2 | * | 6/2004 | Wu ..................... 379/220.01 |

FOREIGN PATENT DOCUMENTS

WO   WO 96/33475   10/1996

* cited by examiner

*Primary Examiner*—Daniel Stcyr (57) ABSTRACT

A new credit card system which enables improved reading and other operations. Reading can be done in the short edge of the credit card thereby shortening the aspect ratio and size of the card reader. The reader can be electrical, reading information via contacts, or can be optical readers.

4 Claims, 9 Drawing Sheets

INTELLIGENT CREDIT CARD SYSTEM

The present application describes a intelligent credit card system and a new way of reading such cards. One mode is specifically adapted for reading credit cards using portable phones.

BACKGROUND

Credit cards are often used in today's society for various purposes, including electronic transactions. Many credit cards are basically a flat piece of plastic with raised numbers. The raised numbers are basically for legacy purposes; i.e., an old-style credit card device that takes an imprint of the raised letters. The credit card information is also encoded on a magnetic strip on the back of the credit card. Newer machines will simply read the information from the credit card's magnetic strip.

Credit card companies assess risk from a credit card transaction in different ways and pass on charges accordingly. Risk is often increased when the credit card itself is not actually used. Credit card companies will often charge extra service fees when the card is not physically present at the time of the transaction.

It has been suggested to use additional identifying information along with the credit information. For example, some credit cards include a photograph of the owner of the authorized user of the credit card. It has also been suggested to use biometric information in conjunction with a transaction, e.g., stored in a smart chip.

SUMMARY

The present application teaches new techniques and paradigms for use in credit card and/or a credit card reader. Different aspects of this system are described herein.

One aspect describes a system that reads the shorter edge of a credit card, to minimize the size of the cardreader that is used.

BRIEF DESCRIPTION OF THE DRAWINGS

These and other aspects of the invention will be described in detail with reference to the accompanying drawings, wherein.

DETAILED DESCRIPTION

A number of embodiments are described herein.

Figure 1:
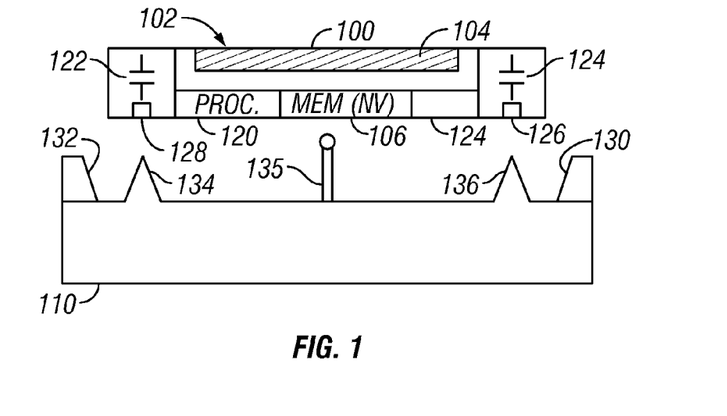
FIG. 1 shows an embodiment of a smart electronic card

FIG. 1 shows a first embodiment of a smart, electronic credit card. The credit card 100 is shown mating with a special credit card reading apparatus 110. The front side of the credit card 102 includes a display 104, and the rear side of the credit card may include a legacy magnetic stripe 106. The front side of the credit card 102 may also include other legacy features such as raised lettering and the like.

As described herein, the display can display certain parts of the information that is stored in the credit card.

The view in FIG. 1 shows a hypothetical cross-section across the credit card. This shows the different structure making up the improved credit card. A first circuitry area 120 includes a processor and non-volatile memory. The credit card also includes first battery area 122, forming the main battery. A supplemental battery 124 is also formed. These two batteries may be connected to different locations. For example, the supplemental battery 124 may operate only to provide credit card information for a transaction. The main battery 122 may handle supplemental information, such as display of information stored in the credit card.

The circuitry area 120 also includes a communication device 123. Communication device may be a serial communication device, which communicates data using a serial protocol such as RS-232, over the electrical connection formed by the contacts 126 and 128. These contacts are connected to both the batteries 122, 124 and to serial device 123. The communication device can communicate by a short range RF protocol, such as Bluetooth™. One or more of the communications techniques can be included within the credit card.

The credit card can be mated with the credit card reader 110. The credit card reader 110 includes special surfaces 130, 132 which press against the edges of the credit card, and hold the credit card into its proper location where the electrical contacts 131, 134 on the card reader mate against the corresponding electrode areas 126, 128 on the credit card. When held in that location, electrical contacts 134, 136 come into contact respectively with the electrodes 127, 128. When only two electrodes are used, another spacer element 135 is also provided which holds the credit card flat on the receiving base.

Alternately, three or four electrodes can be used. When three are used, one positive contact could be used with each battery; and one common ground. Four electrodes may have the advantage of allowing very fast communications, e.g., using Firewire™/IEEE 1394 protocol, or Universal serial bus (USB) protocol, or a fast Ethernet protocol.

As described in further detail herein, when the credit card is mounted on the receiving base 110, communication with the processor and memory is carried via the contacts 136, 134 respectively contacting the contacts 128, 127. In addition, DC power is provided to the contacts, thereby charging the respective batteries at the same time. In one embodiment, the communications device 123 begins its attempt to communicate as soon as it receives a source of external power. This can include sending polls or requests over the serial and/or RF (e.g., Bluetooth) channels.

In an alternative mode, the battery or batteries may be eliminated, and replaced by capacitors, or with no power storage unit at all. In this alternative mode, the circuitry is powered by the connection only. All memories must be non-volatile, and when powered up, immediately begin communicating the stored information.

Figure 2:
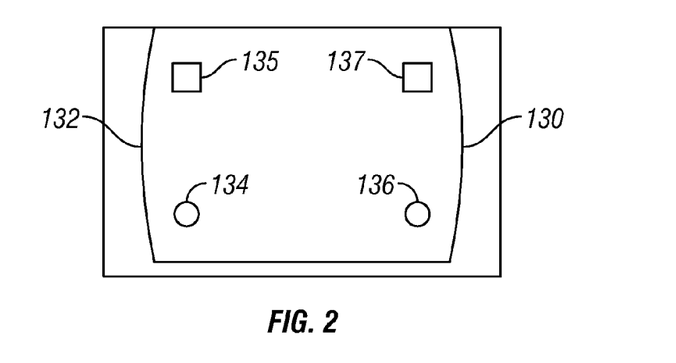
FIG. 2 shows a top view of the credit card system from a more cut away perspective and FIG. 3 shows a front side of the credit card device 100.
Figure 3:
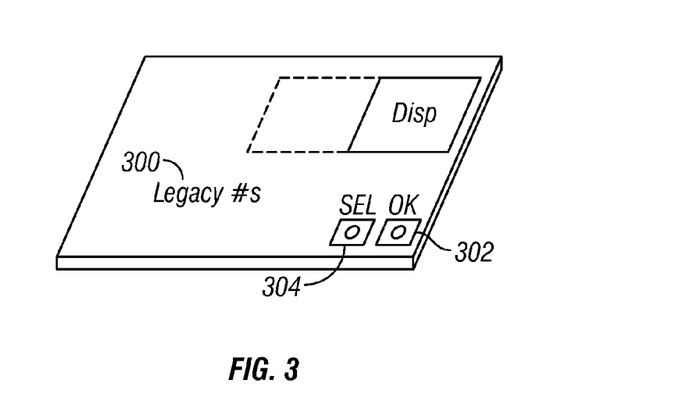

FIG. 2 shows a top view of the system from a more cut away perspective and FIG. 3 shows a front side of the credit card device 100. FIG. 2 shows the four contacts 134, 136, 135, 137. FIG. 2 also shows more details about the side surfaces 130, 132. These side surfaces align the credit card relative to the contacts 134, 136, to allow the credit card to sit flat on the reader and properly aligned relative thereto.

FIG. 3 shows a front view of the credit card. From the front view, it can be seen that the credit card includes legacy numbers 300 which include the raised lettering usually seen on a credit card. The credit card also includes a display which can display certain information from the memory within the circuitry area 120. The display can display one or more of the following items of information: the picture of the authorized user, the credit card number of the credit card, credit remaining, signature information, biometric information, and other information described herein. The credit card also includes actuator buttons 302, 304. By actuating the buttons, different functions can be carried out in different ways. The button 302 is an On switch, which turns on the display and allows the information in the memory to be displayed. The button 304 is a selector switch, which allows scrolling through the different selections. For example, while the credit card is on, the selector switch may allow progressively scrolling between the different allowable displayed modes of operation.

The selector switch can also be held down for an extended time, e.g., 2 seconds, to enter a detail mode. For example, while in the transaction mode, the key can be held down to provide a list of stored transactions. This system can allow browsing the stored contents in the credit card using only two function keys. Alternatively, more function keys can be provided.

While the system above describes use with a credit card, this can also be used with a debit card. The credit limit can then be replaced with bank balance for example.

The embodiment of FIGS. 1-3 show the contacts being on the rear of the credit card. An alternative system places the contacts in different locations.

Figure 4A:
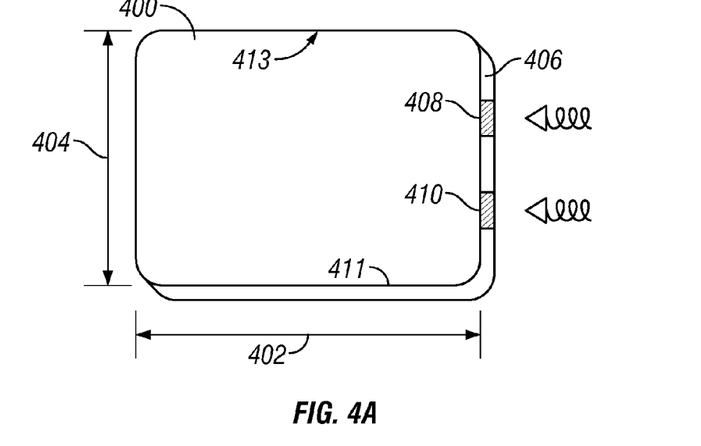
FIG. 4A shows a card which has its information read from the short edge.

One alternative contact system is shown in FIG. 4A. In this contact system, the credit card 400 is, as currently conventional, in the shape of a rectangle with rounded edge corners. The rectangle includes a longer dimension (axis) 402 and a shorter dimension (axis) 404, meeting at the corners, where the term corners may include sharp, right angled corners, rounded corners, or other shape corners. The contacts 408, 410 are provided along the shorter dimension, specifically on the edge 406 of the credit card that has the shorter dimension. These contacts carry out the functions described above, specifically allowing charging the battery and also allowing communication with the circuitry contents of the credit card 400.

Figure 5A:
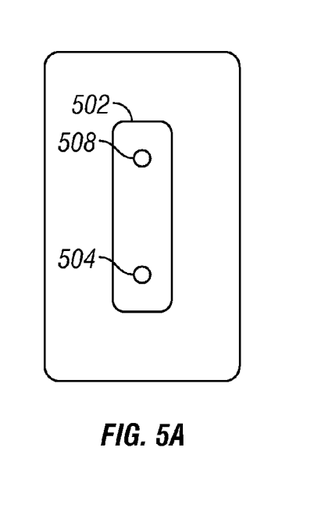
FIG. 5A shows a reader for the card of FIG. 4A.

A card reader for the FIG. 4A system is shown in FIG. 5A. In this card reader, surfaces 500, 502 respectively hold and make contact with the surfaces 411, 413 of the credit card. The edge 406 is pushed into the slot 504. Once the edge is in that slot, the contacts 408, 410 make contact with mating contacts 508, 510 in the slot. In this way, the credit card information can be read by sliding its shorter edge into the slot. The credit card is preferably inserted into the slot in a way such that less than ½ of the length of the longer edge of the credit card is inserted in the slot, more preferably even less, as described herein.

Figure 4B:
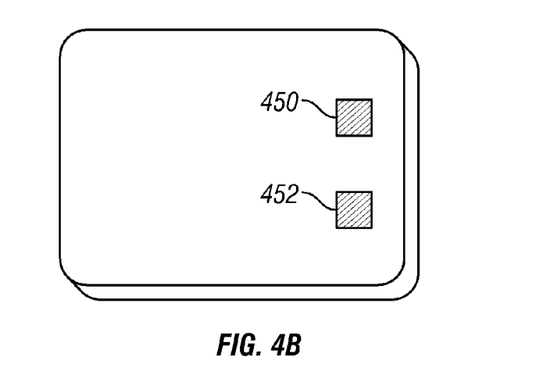
FIG. 4B shows an alternative in which the card has its contacts near the edge; rather than on the edge.
Figure 5B:
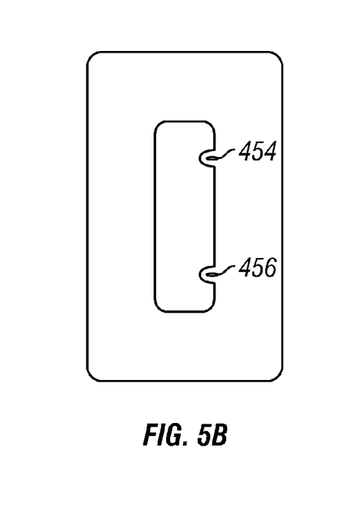
FIG. 5B shows a reader for this card.

This embodiment describes the contacts being on the edge of the credit card. However, the contacts can alternatively be placed on the surface of the credit card, either front or back, but near the edge. This scenario is shown in FIG. 4B which shows a position of the contacts 450, 452 on the surface of the credit card near the edge, (i.e., within 1 inch of the edge). The corresponding reader is shown in FIG. 5B, having spring-loaded contacts 454, 456.

Figure 6:
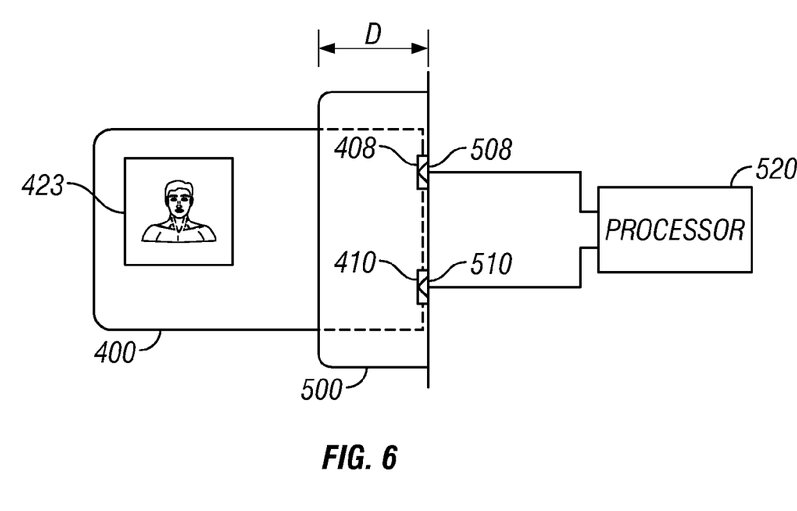
FIG. 6 shows a side on view of the credit card once placed in the slot.

FIG. 6 shows a side on view of the credit card once placed in the slot. In this embodiment, the credit card 400 is slid into the slot so that the contacts, e.g. 408, make contact with the mating contact on the reader 508. Similarly, the contact 410 makes contact with the mating contact on the reader 510. Once that happens, the circuitry within the credit card 400 is activated. The circuitry communicates with the circuitry within the card reader shown generically as 520. As in the above description, this circuitry can include a processor and can also include communication circuitry, e.g., a serial device. The processor can communicate solely with the information in the credit card, but alternatively can also communicate remotely.

One advantage of this system is the ability to make the reader smaller. In this way, the reader can be located on smaller objects, e.g., on a cell phone. Also, the depth "D" of the card reader can be small, e.g., less than 1 inch, more preferably, less than ½ inch. The depth may be small enough that the surfaces of the reader will not hold the credit card in place by themselves; rather, the user must press the card or contact will be lost.

This has the extra advantage of ensuring that the user does not leave the card in the reader. Since the user must hold the card in place, the user cannot simply walk away and leave the credit card there. This provides a dual advantage: it allows a smaller reader and also forces the user to hold onto their credit card.

The credit card is pressed into place to begin communication. When communication is complete, the system issues an indication of the communication being complete. The reader or card, indicating that communication is complete, can produce a "beep". Different sounds can be produced for different actions. For example, one sound can indicate approval for the amount of the sale, e.g. X dollars has been granted. Another, different beep, can signal that the transaction is declined.

After the indication, the user is asked to remove the credit card.

In this embodiment, the display 423 can also automatically display the user's picture as stored in the memory of the credit card when the card is powered by power on the contacts. The display shows the user's picture, and can allow a clerk who is monitoring the credit card transactions to see whether an authorized is using the credit card, or not.

One issue is that the display needs to be made very thin, in order to allow the credit card to have acceptance. Such displays may be expensive or low quality. An alternative embodiment uses the communication device 123 to send the information to a remote terminal, e.g., the terminal where the clerk is carrying out the transaction. The clerk's terminal can display the information, e.g., available credit line, and/or the user's picture. This can facilitate authorizing the transaction.

Figure 7:
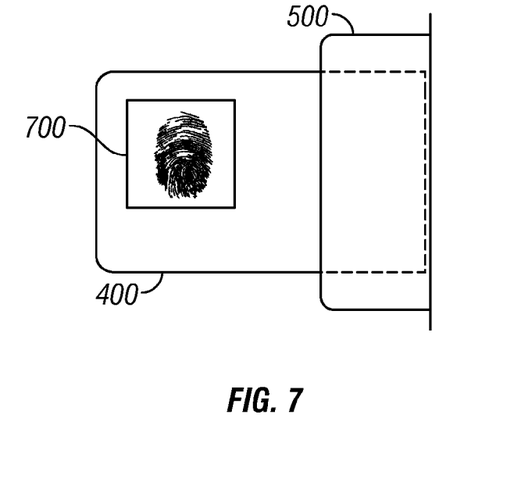
FIG. 7 shows a credit card using a biometric reader.

In another embodiment, the credit card 400 is shown in FIG. 7 within the reading slot 500. In this embodiment, the credit card includes a biometric reader, here a thumbprint reader 700. The user's thumb is placed on the credit card thumb print reader, and information from the thumbprint is used to verify the user's identity. This can use data which is already within the credit card memory or can send the data to a remote location using the communication device 123.

Figure 9:
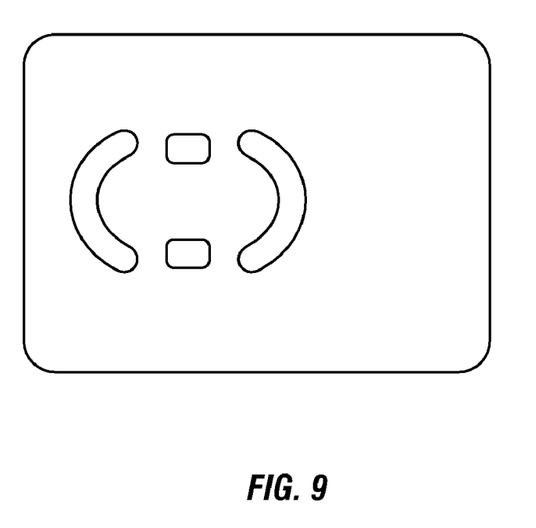

This system can also use smart card style contacts on the credit card, in addition to, and/or in place of, the previously-discussed contact schemes as shown in FIG. 9.

This embodiment forms the slot to have edges that are generally parallel with one edge of the reader. Other embodiments have edges which are not parallel with the edge of the reader.

Figure 8:
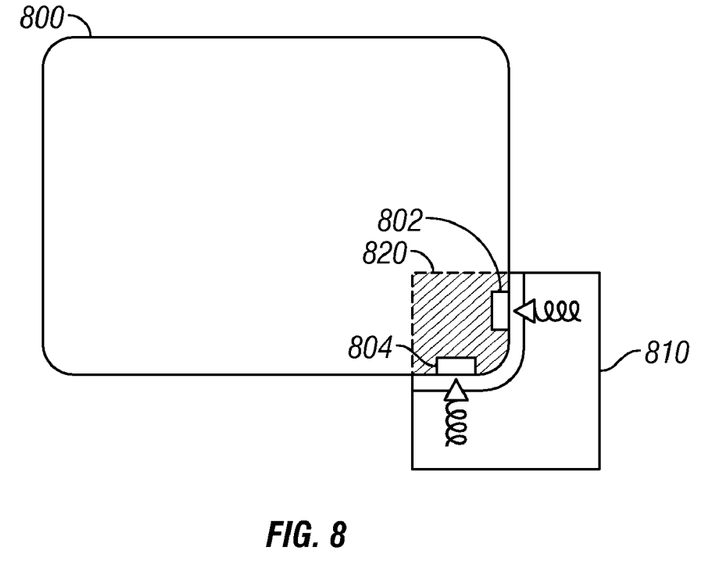
FIG. 8 shows a credit card with contacts on its opposing edges.

An alternative contact arrangement is shown in FIG. 8. In this embodiment, the credit card 800 includes two contacts 802, 804 along respective different edges of the credit card which form a corner of the credit card. By using the corner of the credit card, the insertion depth can be even further reduced.

The credit card of FIG. 8 is shown within the slot 810. In this way, only a very small part of the credit card, here shown as the hashed portion 820, needs to be inserted in the slot. This can provide a minimum amount of insertion into the slot.

One use for said credit cards is in remote communication devices, which are portable devices in self contained housings that have the capability of communicating with a remote information server such as the internet. Remote communication devices may include portable telephones, remote control devices, portable computers, and/or personal digital assistants. In any of these devices, the card can be inserted to carry out a transaction. The remote control can be a TV remote, or an x-10 remote, for example, which communicates with the television, and has its information passed to the internet. The following Figures show this operating with a portable phone such as a cell phone. However, it should be understood that this system could alternatively communicate with any of the remote communications devices described herein.

Figure 10:
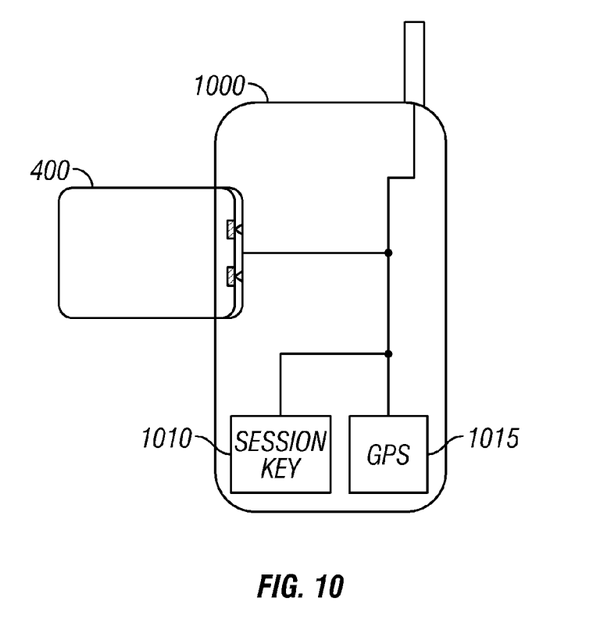
FIG. 10 shows the present invention's credit card within a slot of a cellular phone.

FIG. 10 shows a view of the FIGS. 4A-4B credit card 400 inserted into a slot in a cellular phone 1000. The information from the credit card is read through the contacts into the cell phone. As shown, the credit card is inserted with the short end into to the cell phone to reduce the amount of cell phone area that is taken by the insertion. In this embodiment, information from the credit card may be transferred, along with a session key from encryption device 1010, and optionally also with GPS information from GPS receiver 1015. The use of the session key enables the remote authorizer to determine that the credit card is based on a card that is inserted now, and not on stored information. The session key can be, for example, an encryption using a date and time stamp from a clock within the cell phone, or from the clock included in the cell phone carrier. As described above, certain credit card systems charge extra when the credit card cannot be swiped. In this system, the credit card is actually swiped as part of the procedure, and that fact is cryptologically ascertainable from the information.

The GPS device may provide additional security, since it may provide information about where the user physically was located when the user made the transaction.

During the time while the credit card is inserted, the internal batteries may be charged from the cell phone battery, or, if no batteries are provided, the cell phone power may be used to power the credit card's circuitry.

Figure 11:
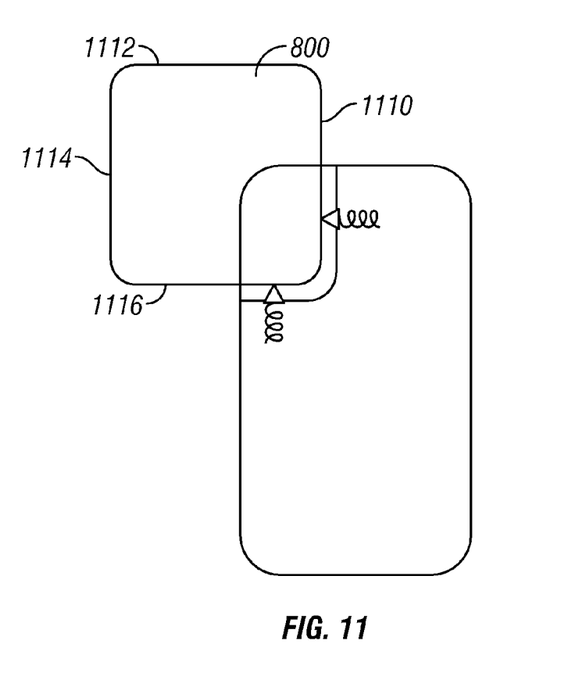
FIG. 11 shows an credit card with its edge only being inserted in a cellular phone.

An alternative embodiment shown in FIG. 11 inserts only the edge which has the contacts, and allows much or most of the credit card to stick out while being read. In this embodiment, the edge type credit card of FIG. 8 may be coupled into the edge card reader in a cell phone. At least part of the each of the four edge surfaces 1110, 1112, 1114, 1116 of the credit card are exposed, when the credit card is inserted in the reader. As can be seen, takes even less real estate on the cell phone for the reader. Preferably, at least 50% of each edge surface is exposed, when the credit card is in the slot, more preferably ⅔ exposed (only ⅓ being inserted), more preferably 80%, and even more preferably, 90%.

Figure 12:
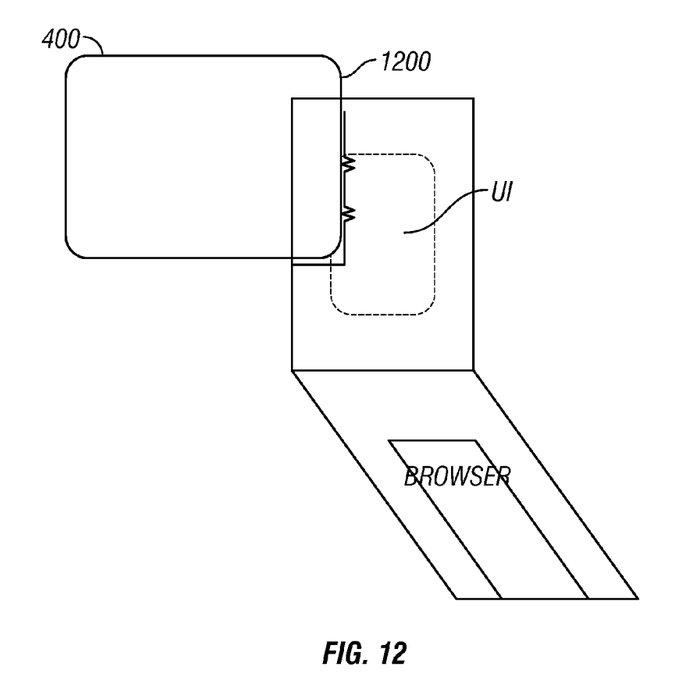
FIG. 12 shows another cell phone slot.

FIG. 12 shows using the edge contact credit card of FIGS. 4A-4B. At least part (e.g., the percentages noted above) of all four edges stick out when the credit card is inserted.

Figure 13:
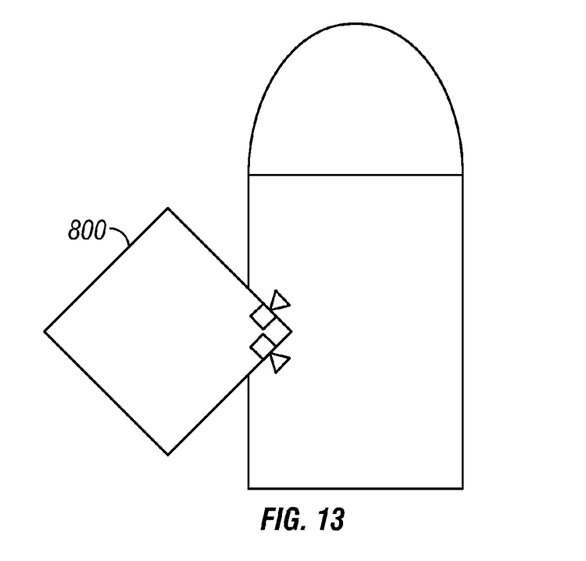
FIG. 13 shows another cell phone credit card slot with contacts on its perpendicular edges.

FIG. 13 shows the edge-contact credit card of FIG. 8 being inserted at an angle relative to the walls of the cell phone housing. The edges of the credit card may be non parallel and non perpendicular to the walls of the housing. For example, FIG. 13 shows the edges being inserted at a 45 degree angle relative to the edges of the cell phone housing.

Figure 14:
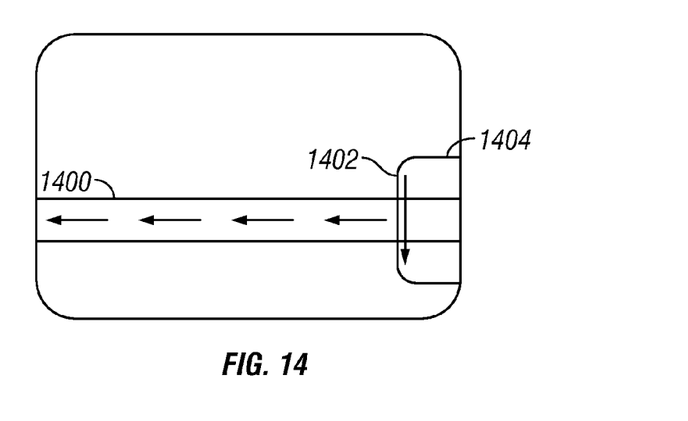
FIG. 14 shows a modified magnetic stripe for use in such an edge read credit card.

Alternative contact arrangements are also shown. Other machine readable forms of information can be placed on the credit card. FIG. 14 shows a modified "legacy" credit card system. FIG. 14 shows the credit card from the rear. The credit card stripe 1400 can be a magnetic stripe, which is intended to be run through a card reader of the currently conventional type, and hence has information that is running in the direction that is parallel to the long edge of the credit card. A portion 1402 of the stripe is, however, reserved. This portion of the stripe is written with information that is directed in the opposite direction, that is, in the direction that is perpendicular to the long edge of the credit card. The portion of the stripe can be the same width as the rest of the stripe, or, as shown, can be enlarged in some dimension as extended portion 1404. The magnetic information on the portion of the stripe allows the short edge of credit card to be read by a card reader.

In one aspect, parts of the magnetic strip are read/write designated, so that they can be written with the kinds of information that have been described above.

Figure 15A:
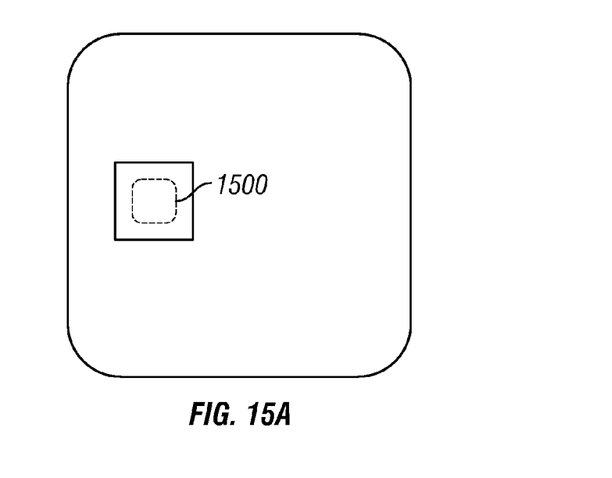
FIGS. 15A and 15B shows a credit card with a removable chip.
Figure 15B:
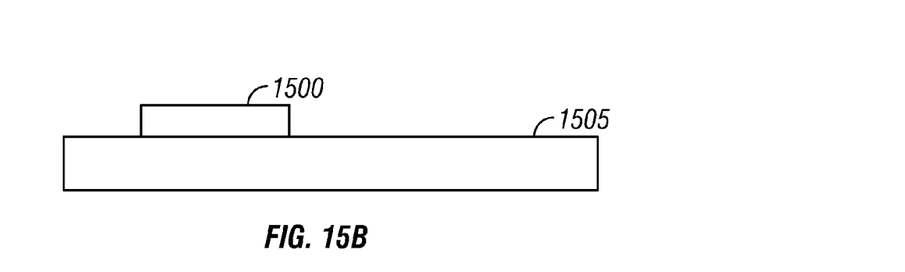

FIGS. 15A and 15B show a credit card of any of the embodiments disclosed herein which includes a removable chip therein. The removable chip can be the smart chip of the type known in the art, or can be a biometric reader chip such as a fingerprint reader. The removable chip 1500 may be located above the surface 1505 of the credit card. In this way, the chip can be removed from the credit card for extra security.

Figure 16:
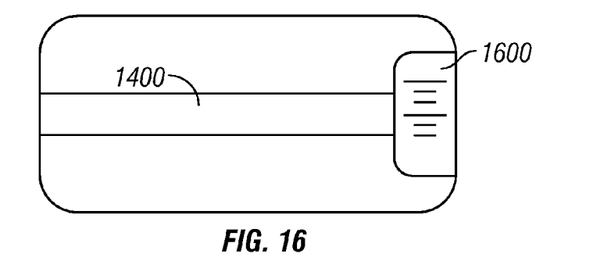
FIG. 16 shows a credit card with a bar code section.

FIG. 16 shows an embodiment in which either in addition to or in place of the magnetic stripe 1400, a bar code section 1600 is provided. The bar code section can include the user's information, such as credit card number and/or biometric information, encoded into a bar code. This can use techniques described in my co-pending application Ser. No. 09/618,988, Jul. 19, 2000 to use a type 39 bar code, digitize the information treated as a base 39 number, and then encoded into the bars on the credit card. The bar code can be written on a surface of the credit card, or can be written on the edge of the credit card.

Figure 17:
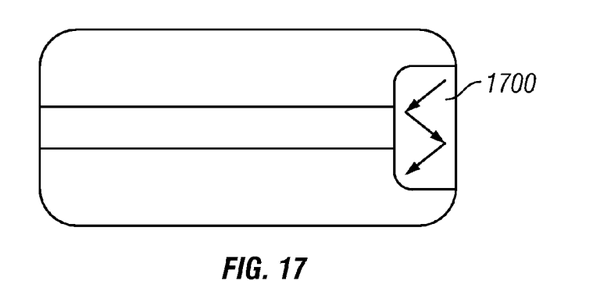
FIG. 17 shows using an optical memory element.

Another embodiment shown in FIG. 17 allows the information to be optically read from the credit card. The optical reading could be a visual reading, such as optical character recognition, or bar code reading. It could alternatively write the information described herein into an optical memory element, such as a hologram 1700. A hologram can encode different kinds of information into the same or similar space by changing the Bragg angle of encoding. This hologram is located on the short edge of the credit card, either on the edge, or adjacent the edge. The hologram can store any of the above described information, specifically, credit card number, biometric information, etc, and can be read by an edge-fed reader.

The hologram can be read only, or can be a read/write hologram.

In any of the above-described embodiments, the credit card is capable of many different kinds of actions. As disclosed herein, the credit card can be mated to the mating connector in FIG. 1, to one of the readers described herein, or to a phone or other remote communication device. However mated, the processor in the mating electronics can carry out the flowchart shown in FIG. 18.

Figure 18:
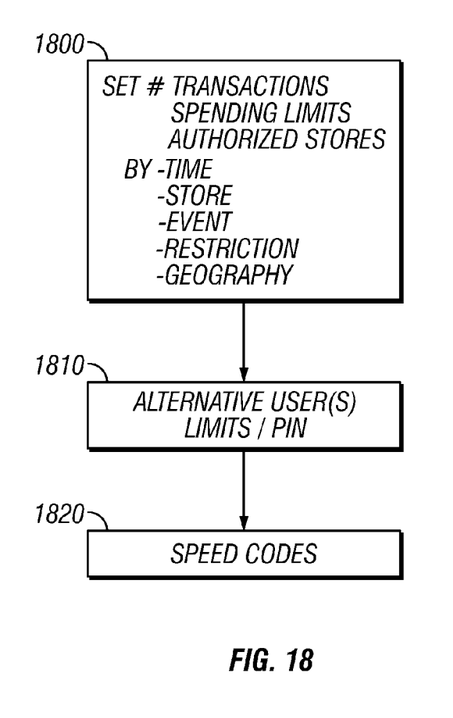
FIG. 18 shows a flowchart of operation.

Since the credit card uses storage therein which enables the credit card contents to be used as part of a transaction, a first operation at 1800 enables setting parameters. The parameters can include allowable number of transactions, spending limits and authorized places. The conditions can include time, specific allowed stores, and event. For example, the event can allow a specified setting, with or without conditions, until a code such as a personal identification number ("pin") is entered. The pin can be stored in the non-volatile memory and entered via the keys on the credit card.

Other conditions can include geographical restrictions or setting the restrictions to be on or off.

These events may allow the credit card to be used for actions by another. A parent, for example, can give the credit card to a child or an employer can give the credit card to a worker. The owner can set the kinds of transactions, limits or authorized stores where the surrogate can use the card. The owner can set the amount of time that the authorization is valid, information on authorized surrogates (e.g., their photo or biometric). The owner can also set an ending condition. For example, the user can tell the child that they can spend up to $200. They can set a spending limit either for the next 24 hours, or until the pin is entered to reset the card.

Speed codes may also be defined to allow quickly setting parameter sets that the user might want often. A speed code may be entered by selection using the buttons on the credit card. For example, speed code menu may be defined. The speed code S18 may allow a specified user to do a specified action for a specified time, For example allow Joe Blow to buy $500 at Home Depot and automatically expire after 24 hours unless a pin is entered.

1810 allows managing users. This allows an alternative authorized user. For example, it may allow someone's worker or child to use the card, again with the condition and limits defined in 1800. One alternative is that the limits may be preset to avoid duress, e.g. to avoid during a robbery the requirement that the user enter authorized users. The photo and/or biometric of the authorized user may be entered.

1830 defines a security mode. In the security mode, the credit card is only activated if certain features occur. One aspect of the security mode may include requiring the user to enter a personal identification number or biometric information as part of each transaction. Users, however, may resist this extra step. Another aspect, therefore, requires the users to enter this identifying information every predetermined interval of time in order to keep the credit card valid. For example, the user might be required to enter the pin every 24 hours. If 24 hours elapses without the pin being entered, the user is signaled e.g. via the display or via a beep, when they attempt to use the credit card. Thereafter, they can enter the pin into the card.

Additional keys, such as arrow keys, can be added to the credit card, to enable a pin to be entered. The user can scroll through different options to select different letters and/or numbers.

Alternately, the code can be via a biometric reader. The pin can be entered via the user terminal, when the credit card is swiped. A touch sensitive screen can be used, to allow a keyboard to be displayed and to select items from the keyboard. This system can also use a handwriting recognition device such as the Graffiti™ option of the Palm™ operating system.

Figure 19:
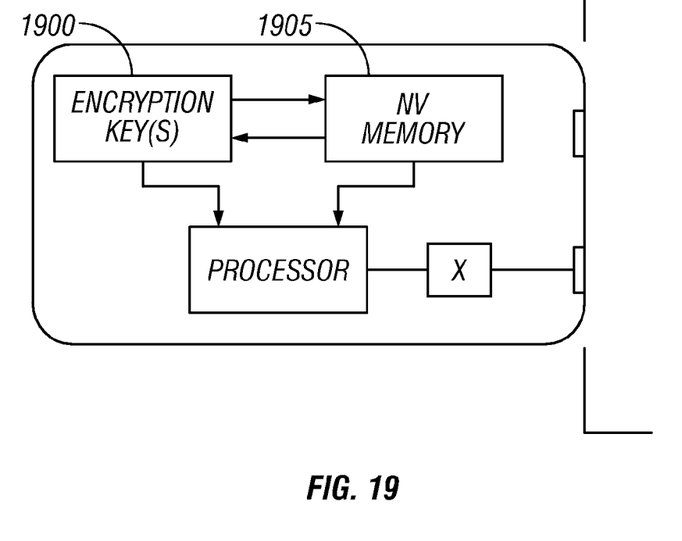
FIG. 19 shows a credit card being used to store a cryptographic key.

FIG. 19 shows using the credit card for yet another new feature. Encryption of messages often requires that a private key be possessed by a user and maintained secret by the user. Different techniques have been disclosed to maintain secret the private key. These techniques have included, for example, keeping the private key on the user's computer. Other techniques disclosed in my co-pending application Ser. No. 09/577,449 have used the user's biometrics as the key or part of the key.

According to the present system, the private key is stored in the credit card e.g. in the removable chip part of the credit card or in the smart card part. In one aspect, information from the removable smart card can be stored into the nonvolatile memory but is stored with a temporary life. For example, the information is stored in memory with an expiration of one week or one month or like. After that time, the circuitry automatically securely wipes the information from the memory.

FIG. 19 shows inserting the credit card into a credit card reader in order to carry out encryption and/or decryption of a message. Since no security is necessary for the public key, the public key can simply be stored in the nonvolatile memory 1905. The private key is stored in either a smart chip 1900 or the nonvolatile memory in a more secure way. The private key is used to decrypt a message as explained herein. A processor may be located on the credit card, to aid in decryption on the credit card, so that the keys do not need to be sent off the credit card.

Figure 20:
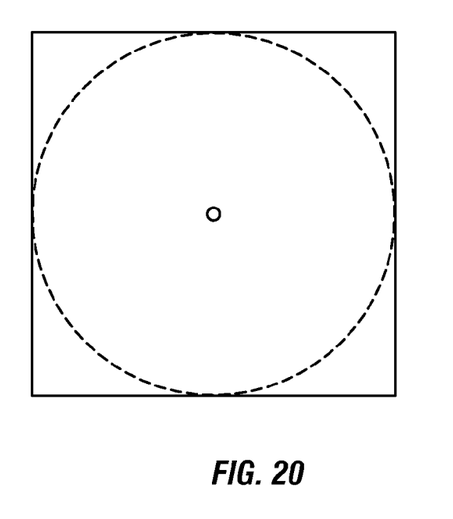
FIG. 20 shows a credit card CD card.

Another aspect of the present system uses a credit card, as shown in FIG. 20, formed of the so-called CD card. Such CD cards are substantially the form and shape of a credit card, but have CD or DVD information imprinted thereon. Such CD cards are available, for example, from the CD card Corporation; www.CDcard.cc. In this embodiment, the credit card information is printed on the front of the CD card, and more detailed information is imprinted within the CD information. For example, the rear of the card may include a CD which stores biometric information about the user, including a users fingerprint, user's photo, and the like.

Other embodiments are within the disclosed invention. For example, the present application describes the ways that edges of credit cards including the short edges, and the corners between two edges, of credit cards could be read. Two specific examples of short edges and corner edges are disclosed as reading from electrical contacts. It should be understood, however, that other forms of credit card information, including the disclosed optical storage, barcodes, and any other form of credit card information storage, could also be stored similarly on the edge of the credit cards. The present invention contemplates reading these other kinds of information from the short edges of the credit card and/or the corner of the credit card, as disclosed. All such modifications are intended to be encompassed within the following claims.

The invention claimed is:

1. An electronic credit card, comprising:
a credit card housing having a front surface showing a credit card number, and having electronic circuitry coupled to said housing, associated with a credit card account based on said credit card number; a communication device, also coupled with said housing, and coupled with said electronic circuitry in said housing, communicating information to and from said electronic circuitry using a short range RF protocol, wherein said electronic circuitry includes a memory storing an individual characteristic representative of an authorized user of the credit card; further comprising a display which displays said individual characteristic, and wherein said individual characteristic is a user's picture, and said display displays said user's picture when a transaction is requested; further comprising connections for an external source of power to drive said electronic circuitry and said communication device, wherein said connections for an external source of power include external electrodes intended to be coupled to a source of power, and wherein said electronic circuitry immediately begins operating upon detecting said external source of power.

2. An electronic credit card, comprising:
a credit card housing having a front surface showing a credit card number, and having electronic circuitry coupled to said housing, associated with a credit card account based on said credit card number; a communication device, also coupled with said housing, and coupled with said electronic circuitry in said housing, communicating information to and from said electronic circuitry using a short range RF protocol, wherein said electronic circuitry includes a memory storing an individual characteristic representative of an authorized user of the credit card; further comprising a display which displays said individual characteristic, and wherein said individual characteristic is a user's picture, and said display displays said user's picture when a transaction is requested; further comprising connections for an external source of power to drive said electronic circuitry and said communication device, wherein said connections for an external source of power include external electrodes intended to be coupled to a source of power, and wherein said communication device attempts to communicate immediately upon receiving power from said source.

3. An electronic credit card, comprising:
a credit card housing having a front surface showing a credit card number, and having electronic circuitry coupled to said housing, associated with a credit card account based on said credit card number; a communication device, also coupled with said housing, and coupled with said electronic circuitry in said housing, communicating information to and from said electronic circuitry using a short range RF protocol, wherein said electronic circuitry includes a memory storing an individual characteristic representative of an authorized user of the credit card; further comprising a display which displays said individual characteristic, and wherein said individual characteristic is a user's picture, and said display displays said user's picture when a transaction is requested, wherein said front surface includes raised lettering indicating the credit card number.

4. An electronic credit card, comprising:
a credit card housing, having a first surface bearing credit card indicia, and including electronic circuitry coupled within said housing, said electronic circuitry associated with a credit card account associated with said credit card indicia, said electronic circuitry including a memory which stores information about the user's picture, and which displays said user's picture on an electronic display in response to a transaction; further comprising a communication device, also coupled with said credit card housing, and which communicates information to and from said electronic circuitry using a short range RF protocol, wherein said communication device immediately starts operating upon receiving said external source of power.

* * * * *